United States Patent
Suzuki et al.

(10) Patent No.: US 9,723,387 B2
(45) Date of Patent: Aug. 1, 2017

(54) OPTICAL SIGNAL PROCESSING DEVICE WITH AN ARRAY WAVEGUIDE COUPLED TO A SLAB WAVEGUIDE WITH TWO ARCS

(71) Applicant: NIPPON TELEGRAPH AND TELEPHONE CORPORATION, Tokyo (JP)

(72) Inventors: Kenya Suzuki, Atsugi (JP); Kazunori Seno, Atsugi (JP); Naoki Ooba, Atsugi (JP); Tetsuo Takahashi, Atsugi (JP); Toshio Watanabe, Atsugi (JP); Takeshi Kawai, Yokosuka (JP); Mitsunori Fukutoku, Yokosuka (JP); Yuzo Ishii, Atsugi (JP); Koichi Hadama, Atsugi (JP); Yuichi Higuchi, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 27 days.

(21) Appl. No.: 14/429,680

(22) PCT Filed: Sep. 27, 2013

(86) PCT No.: PCT/JP2013/005785
§ 371 (c)(1),
(2) Date: Mar. 19, 2015

(87) PCT Pub. No.: WO2014/050145
PCT Pub. Date: Apr. 3, 2014

(65) Prior Publication Data
US 2015/0237420 A1    Aug. 20, 2015

(30) Foreign Application Priority Data
Sep. 27, 2012   (JP) .................................. 2012-214336

(51) Int. Cl.
*H04Q 11/00* (2006.01)
*H04B 10/25* (2013.01)

(52) U.S. Cl.
CPC ......... *H04Q 11/0005* (2013.01); *H04B 10/25* (2013.01); *H04Q 2011/0016* (2013.01); *H04Q 2011/0041* (2013.01)

(58) Field of Classification Search
CPC   G02B 6/356; G02B 6/12011; G02B 6/12014; G02B 6/12019
(Continued)

(56) References Cited

U.S. PATENT DOCUMENTS 5,243,672 A * 9/1993 Dragone ............ G02B 6/12011
385/17
5,414,548 A * 5/1995 Tachikawa ......... G02B 6/12014
385/14
(Continued)

FOREIGN PATENT DOCUMENTS

JP    H10-227933    8/1998
JP    2003-75663    3/2003

OTHER PUBLICATIONS

International Preliminary Report on Patentability and Written Opinion in corresponding Application No. PCT/JP2013/005785 dated Mar. 31, 2015.
(Continued)

*Primary Examiner* — Akm Enayet Ullah
(74) *Attorney, Agent, or Firm* — Workman Nydegger

(57) ABSTRACT

To provide an optical signal processing device that can collect light from an input waveguide to form a beam array having a small diameter. The optical signal processing device includes input waveguides 302a to 302c, an array waveguide 305 and a slab waveguide 304 that is connected to a first arc 304a having the single point C as a center and
(Continued)

input waveguides 302a to 302c and that is connected to a second arc 404b having the single point C as a center and an array waveguide 305.

13 Claims, 15 Drawing Sheets

(58) Field of Classification Search
USPC .................................................... 385/14–24
See application file for complete search history.

(56) References Cited

U.S. PATENT DOCUMENTS

| | | | | |
|---|---|---|---|---|
| 5,822,481 | A * | 10/1998 | Mestric | G02B 6/125 |
| | | | | 372/6 |
| 5,841,919 | A * | 11/1998 | Akiba | G02B 6/12011 |
| | | | | 385/14 |
| 5,940,555 | A | 8/1999 | Inaba et al. | |
| 6,122,419 | A * | 9/2000 | Kurokawa | G02B 6/12007 |
| | | | | 372/77 |
| 6,697,552 | B2 * | 2/2004 | McGreer | G02B 6/12011 |
| | | | | 385/37 |
| 6,810,167 | B2 * | 10/2004 | Tabuchi | G02B 6/12011 |
| | | | | 385/129 |
| 6,853,769 | B2 * | 2/2005 | McGreer | G02B 6/105 |
| | | | | 385/10 |
| 6,985,567 | B2 * | 1/2006 | Vallinen | H04L 12/14 |
| | | | | 379/114.01 |
| 6,985,657 | B2 * | 1/2006 | Nakagawa | G02B 6/12011 |
| | | | | 385/39 |
| 7,397,980 | B2 | 7/2008 | Frisken | |
| 9,091,817 | B2 * | 7/2015 | Wagener | G02B 6/32 |
| 2003/0007718 | A1 * | 1/2003 | Bazylenko | G02B 6/12019 |
| | | | | 385/14 |
| 2003/0021567 | A1 * | 1/2003 | Yoneda | G02B 6/1203 |
| | | | | 385/129 |
| 2004/0047561 | A1 * | 3/2004 | Tuda | G02B 6/12004 |
| | | | | 385/39 |
| 2004/0067006 | A1 * | 4/2004 | Welch | B82Y 20/00 |
| | | | | 385/14 |
| 2004/0151432 | A1 * | 8/2004 | Tabuchi | G02B 6/12011 |
| | | | | 385/37 |
| 2005/0276537 | A1 | 12/2005 | Frisken | |
| 2009/0214226 | A1 * | 8/2009 | Mizuguchi | H04B 10/677 |
| | | | | 398/202 |
| 2011/0091155 | A1 * | 4/2011 | Yilmaz | G02B 6/4207 |
| | | | | 385/30 |

OTHER PUBLICATIONS

Seno et al., "Spatial Beam Transformer for Wavelength Selective Switch Consisting of Silica-Based Planar Lightwave Circuit," OFC/NFOEC Technical Digest, Optical Society of America, 3 pages, Jan. 23, 2012.

International Search Report in corresponding Application No. PCT/JP2013/005785 dated Oct. 29, 2013.

* cited by examiner

OPTICAL SIGNAL PROCESSING DEVICE WITH AN ARRAY WAVEGUIDE COUPLED TO A SLAB WAVEGUIDE WITH TWO ARCS

TECHNICAL FIELD

The present invention relates to an optical signal processing device used for an optical communication network.

BACKGROUND ART

With an explosive spread of data communication networks such as the Internet, optical communication networks having a larger capacity are increasingly required. In order to satisfy the demand for such networks, multiple-wavelength communication has been put into a practical use. In addition, another demand has been found in recent years for a wavelength-selective switch (WSS: Wavelength Selective Switch) enabling forwarding switching. One of conventional wavelength-selective switches is disclosed in Non-Patent Literature 1.

FIG. 12 illustrates a wavelength-selective switch disclosed in Non-Patent Literature 1. The wavelength-selective switch described in Non-Patent Literature 1 discloses that a WSS input optical system includes a lens optical system configured on a waveguide that is used to simplify the WSS optical system to thereby realize a smaller size and a lower price. Specifically, an optical waveguide formed on a substrate 100 is integrated with the WSS input optical system. An optical signal inputted through an input waveguide 101 enters an array waveguide 103 via an input slab waveguide 102. The array waveguide 103 is formed to have the same length as that of each waveguide. Gaussian beam is outputted from an output end Point A the output slab waveguide 104 to have a wide width.

When the input slab waveguide 102-side waveguides in the array waveguide 103 have a pitch d1 equal to a pitch d2 between the output slab waveguide 104-side waveguides (i.e., when d1=d2 is established), then the Gaussian beam at the above-described output end Point A has a width W that is represented by the following equation (1) when assuming that the input waveguide 101 in a waveguide mode has a width $w_0$.

[Equation 1]

$$W = w_0 \sqrt{1 + \left(\frac{\lambda f_{slab}}{\pi n_s w_0^2}\right)^2} \quad (1)$$

A collimated beam having the width W shown in the equation (1) is also outputted from the waveguide output end. Furthermore, an optical signal inputted from an input waveguide other than the input waveguide 101 (i.e., from the input waveguide 101b) is outputted from the waveguide output end as a beam whose beam center exists in the above-described output end Point A and whose inclination corresponds to the distance x between the input waveguides 101 and 101b.

The input optical system formed on the substrate 100 shown in FIG. 12 is suitable for a switch configuration in which the space optical system has 4f. As shown in FIG. 12, 4f is shown by an equation in which 4f=(distance f from waveguide chip 100 to lens 105a)+(distance f from lens 105a to the diffraction grating 106)+(distance f from the diffraction grating 106 to lens 105b)+(distance f from lens 105b to LCOS 107).

The above-described space optical system is suitable for an optical system in which the same optical power element (lens) is used for both of the switch axial direction and the wavelength direction to perform a wave front formation. In FIG. 12, an optical signal outputted from the substrate 100 enters, via two lenses 105a and 105b and a diffraction grating 106, the LCOS 107 functioning as a light deflection element. However, an optical signal inputted through a different input port (e.g., input ports 101 and 101b) enters the LCOS 107 at a different angle. The principal rays of these beams reach the LCOS 107 at the same position. Thus, the LCOS 107 can be used to deflect the beam to optically-couple the optical signals from the different input ports, thereby realizing a switch function.

The optical system shown in FIG. 12 is suitable for the optical system of 4f but cannot be applied to optical systems having the other configurations. For example, in the case of the 2f optical system as shown in FIG. 13, an optical signal outputted from the input fiber 201a is sent through a light path 204 and a lens 202 and enters the LCOS 203 functioning as a light deflection element. Then, the incident light is deflected by the LCOS 203 and is coupled by optical fibers 201b via the light path 205. In this case, the optical signal preferably enters the LCOS 203 as a collimated beam. The optical signal from the input fiber 201a propagates as a diffusion beam 204a in a range in front of the lens 202 (a range between the input fiber 201a and the lens 202).

In the case of the 2f optical system, a conventional input optical system made on a substrate cannot be used, thus failing to provide a simple optical system or a simple assembly. In the 2f optical system, the optical fibers 201a and 201b preferably output beams for which the principal rays thereof are parallel to each other and the diameters are relatively small. However, a conventional configuration is not suitable for the formation of such a beam. Ideally, the output beam from the optical fibers is preferably small enough to form a Fraunhofer region in order to propagate by a lens focal point distance f. When the output beam is too small on the other hand, the beam expands excessively while propagating the space. Thus, as shown in FIG. 14, a measure is also required according to which the output ends of the optical fibers are provided with micro lens arrays 205, respectively, to provide a beam waist having a certain size and to suppress the beam waist sizes of the optical fiber output end, thereby reducing the numerical aperture.

The necessity as described above is more increased in the case of the optical system disclosed in Patent Literature 1. FIG. 15 is the same as FIG. 7 of Patent Literature 1 and shows the configuration of a wavelength selective switch in which an LCOS is used as a switching element. In the wavelength selective switch shown in FIG. 15, the LOCS element has a polarization dependency and thus requires a polarization diversity optical system in which the polarization status of input light to the LCOS is aligned in one direction. In the polarization diversity optical system as described above, a polarization separation element 215 is used to separate optical signals from the respective input fibers 201 to 205 (see beams 291 and 294) to beams of orthogonal polarization components (see beams 292 to 296). Thereafter, an optical element in which glass 221 and λ/2 wave plates 222 are arranged in a ladder-like manner is used to align the separated beams of the orthogonal wavelength components. In this case, the optical element 220 must have a very-small opening consisting of the glass 221 and the λ/2 wave plates 222 and the interior must allow incident light to pass through without being blocked.

In FIG. 15, the reference numeral 210 denotes a micro lens array and the reference numeral 230 denotes a birefringent wedge element.

CITATION LIST

Non Patent Literature

NPL 1: Kazunori Seno, Kenya Suzuki, Naoki Ooba, Toshio Watanabe, Masayuki Itoh, Tadashi Sakamoto and Tetsuo Takahashi, "Spatial beam transformer for wavelength selective switch consisting of silica-based planar lightwave circuit", in Optical Fiber Communication Conference and Exposition (OFC) and National Fiber Optic Engineers Conference (NFOEC) (Optical Society of America, Washington, D.C., 2012), JTh2A.5.

Patent Literature

PTL1: U.S. Pat. No. 7,397,980

SUMMARY OF INVENTION

Technical Problem

In the 2f optical system, the output beams from the optical fibers are preferably configured so that principal rays of the optical signals from the respective fibers are parallel and the respective beam waists are sized to be applied within a certain width. Such an input optical system can be realized by providing a micro lens array in an optical fiber array. However, such realization requires a highly-accurate alignment between the micro lens array and the optical fiber array, thus resulting in the problem of a poor manufacture tolerance.

In the case of the optical system of Patent Literature 1, the optical element 220 must have a very small opening having of glass 221 and a λ/2 wavelength plate 222 so that incident light can pass through the opening without being blocked. However, in such a case, the positioning of the micro lens array 210 and the optical fibers 201 to 205 must be adjusted accurately, thus causing a significantly-disadvantageous mass producibility. Specifically, the positioning of the micro lens array 210 and the optical fibers 201 to 205 requires a high accuracy, which makes it difficult to mass-produce this optical system.

In view of the above, the present invention has been produced to address the problem as described above. It is an objective of the invention to provide an optical signal processing device that collects the light from an input waveguide to form a beam array having a small diameter. It is also an objective of the invention to provide a mass-producible optical signal processing device.

Solution to Problem

In order to solve the above problem, the present invention provides an optical signal processing device including a waveguide formed on a substrate, comprising an input waveguide, an array waveguide, and a slab waveguide having at least one first arcs provided around a single point as a center connected to the input waveguide, and a second arc provided around the single point as a center connected to the second arc.

An output end of the input waveguide may be formed toward the single point. Alternatively, an output end of the input waveguide may be formed toward a different point from the single point.

An input end of each waveguide of the array waveguide may be formed toward the single point.

A path length of the array waveguide may have a length distribution represented by a polynomial expression with regard to the number allocated to a waveguide within a waveguide in the array waveguide.

The position of the waveguide at an input end of the array waveguide and the position of the waveguide at an output end of the array waveguide may allow for one-to-one coordinate conversion.

The array waveguide may be connected, with regard to an arc forming the output end face of the slab waveguide, to a position obtained by modulating a distance from the single point to the arc.

The output end of the array waveguide may be disposed in a curved manner represented by a polynomial expression in a light axis direction.

Advantageous Effects of the Invention

According to the present invention, light from an input waveguide can be collected to form a beam array with a small diameter.

DESCRIPTION OF EMBODIMENTS

The following section will describe an optical signal processing device as the first to eleventh embodiments of the present invention. Optical signal processing devices according to the respective embodiments are a wavelength-selective switch.

<First Embodiment>

The following section will describe the first embodiment of the optical signal processing device of the present invention.

[Configuration of Optical Signal Processing Device]

Figure 1:
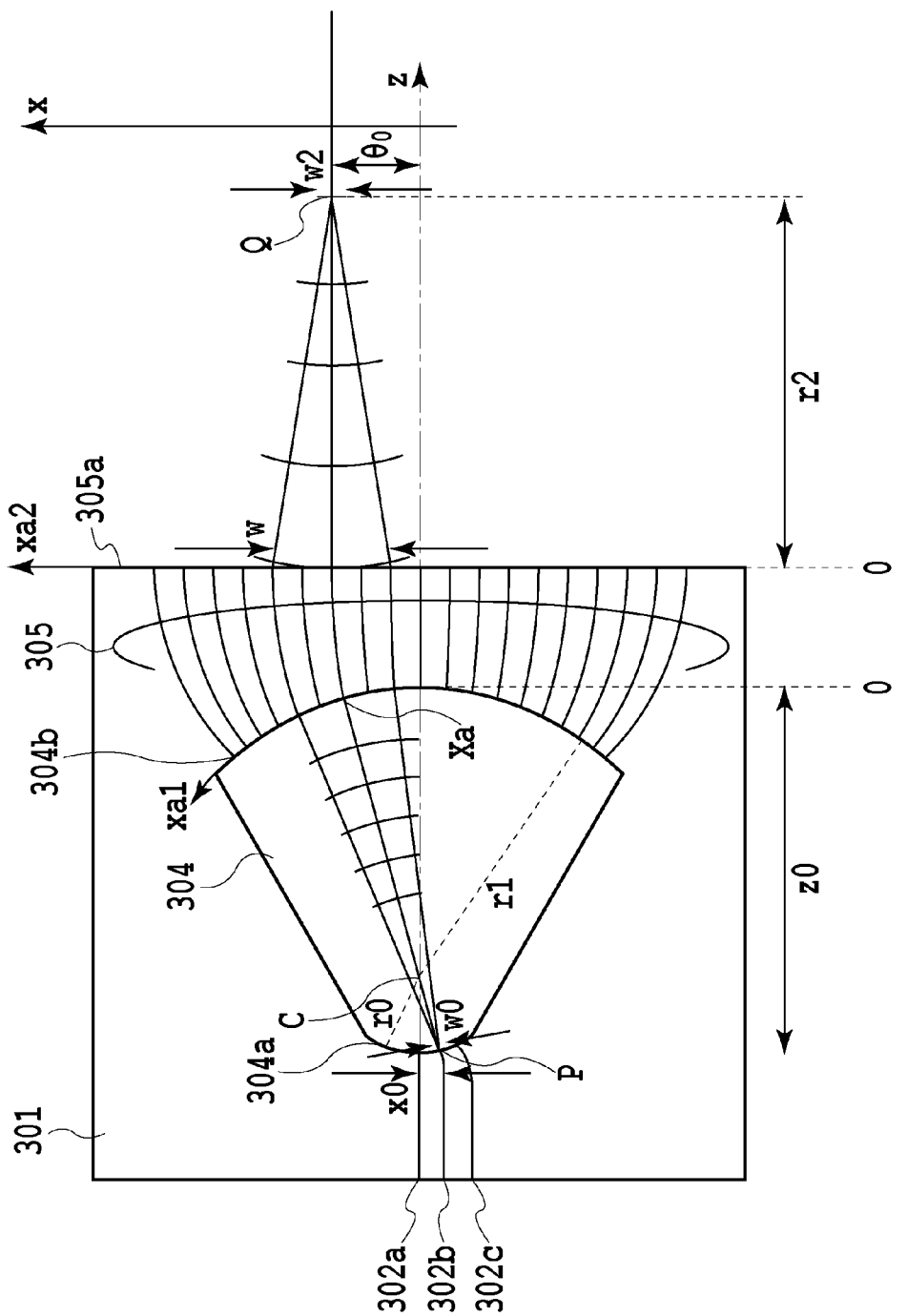
FIG. 1 illustrates an example configuration of an optical signal processing device according to the first embodiment.

FIG. 1 illustrates an example configuration of the optical signal processing device according to the first embodiment of the present invention.

In the optical system shown in FIG. 1, the optical signal processing device includes an optical waveguide formed on a waveguide substrate 301. The optical waveguide includes input waveguides 302a, 302b and 302c, a slab waveguide 304, and an array waveguide 305.

The slab waveguide 304 has an arc face (a first arc) 304a having a radius r0 around a point C as a center and an arc face (a second arc) 304b having a radius r1 around a point C as a center. In FIG. 1, r0<r1 is established but r0>r1 or r0=r1 also may be established. Also, r0≥0 is established.

Input waveguides 302a to 302c are connected to the arc face 304a of the slab waveguide 304. Optical signals from the input waveguides 302a to 302 are inputted to the slab waveguide 304 via the arc face 304a. The respective pitch of the input waveguides 302a to 302c are all shown by x0 as shown in FIG. 1.

Output ends of the input waveguides 302a to 302c connected to the arc face 304a of the slab waveguide 304 are arranged toward the point C, respectively. In the example of FIG. 1, the output end P of the input waveguide 302b is provided toward the point C for example.

The respective waveguides of the array waveguide 305 are connected to the arc face 304b of the slab waveguide 304. An optical signal from the slab waveguide 304 is inputted via the arc face 304b to the array waveguide 305. In this embodiment, the respective waveguides of the array waveguide 305 have light paths so as to have a light difference of zero, respectively. All of the waveguides provided in the input end 304b of the array waveguide 305 have a pitch d1. All of the waveguides provided in the output end 305a of the array waveguide 305 have a pitch d2. Specifically, the above-described input end 304b and the output end 305a have pitches equal to each other.

The respective waveguides of the array waveguide 305 have input ends provided toward the point C, respectively.

In the following description of this embodiment, it is assumed that the array waveguide 305 has the output end 305a having a flat face for simple description.

[Operation of Optical Signal Processing Device]

Next, the following section will describe the operation of the optical signal processing device of this embodiment with reference to the drawings again.

This optical signal processing device will be described with regard to an example in which an optical signal inputted from the input waveguide 302b is used to give a Gaussian beam having a width w2 to a point Q for example.

The optical signal from the input waveguide 302b is inputted from the output end P of the input waveguide 302b to the slab waveguide 304. In this embodiment, the input waveguide 302b has an output end P formed in the direction of the point C. Thus, the optical signal outputted to the slab waveguide 304 reaches, as shown by the solid line of FIG. 1, the arc face 304b of the slab waveguide 304 while the diffusing principal ray thereof passes in the vicinity of the point C. The beam diameter at the arc face 304b of the slab waveguide 304 is represented by the following equation (2).

[Equation 2]

$$W = w_0 \sqrt{1 + \left(\frac{\lambda(r_0 + r_1)}{\pi n_s w_0^2}\right)^2} \quad (2)$$

In the equation (2), ns represents a refractive index of the slab waveguide 304, $\lambda$ represents a wavelength of an optical signal and w0 represents a mode diameter of the zeroth mode of the input waveguide 302b.

As shown in FIG. 1, a wave front of the optical signal has a spherical shape which has the point P as the center. Thus, both end components of the wave front reach the input end 304b of the array waveguide 305 faster than then component at the center of the wave front. The component at the center of the wave front reaches the input end 304b of the array waveguide 305 slower than both end components of the wave front.

Thus, the wave front space distribution with regard to the respective waveguides in the array waveguide 305 is obtained by calculating a difference between a curvature radius forming an arc of the arc face 304b of the array waveguide and the space distribution of the phase of the wave front at the arc face 304b. Specifically, the arbitrary coordinate Xa of the input-side and output-side boundary planes of the array waveguide 305 is represented by a polar form having the point C at the center (−r1+r1×cos(θ), r1×sin(θ)). When assuming that the input point of the optical signal at the array waveguide 305 (i.e., the coordinate of the end P of the input waveguide 302b) is (z0, x0), then the wave front space distribution to each waveguide in the array waveguide 305 is represented by the following equation (3).

[Equation 3]

$$\frac{\phi(\theta)}{\beta} = PX = [\{-z_0 - (-r_1 + r_1\cos\theta)\}^2 + \{x_0 - r_1\sin\theta\}^2]^{1/2} \quad (3)$$

In the equation (3), $\phi(\theta)$ represents the phase distribution in the array waveguide 305 and $\beta$ represents the propagation constant of an optical signal in the slab waveguide ($\beta=2\pi n_s/\lambda$).

At the output end 305a of the array waveguide 305, a position at which each waveguide is provided has a coordinate proportional to θ. Thus, the space distribution represented by the equation (3) is a phase distribution itself in a free space.

When θ shown in the equation (3) is subjected to Maclaurin expansion until a squared term is applied, then the result is represented by the following equation (4).

[Equation 4]

$$\frac{\phi(\theta)}{k} = \sqrt{z_0^2 + x_0^2} - \frac{r_1 x_0}{\sqrt{z_0^2 + x_0^2}}\theta - \frac{r_1 z_0 (z_0^2 - r_1 z_0 + x_0^2)}{\sqrt[3]{z_0^2 + x_0^2}}\theta^2 \quad (4)$$

In the equation (4), θ is represented by the following equation (5) when assuming that the angle obtained when the point Xa on the array boundary 304b is seen from the point C is θ, the pitch between waveguides at the input end 304b of the array waveguide 305 is d1 and the array number.

[Equation 5]

$$\theta = \frac{d_1 i}{r_1} \quad (5)$$

In this case, θ is equal to the coordinate xa2 at the output end 305a side (space side) of the array waveguide 304. Specifically, when assuming that a pitch between waveguides at the output end 305a of the array waveguide 305 is d2m, θ is represented by the following equation (6).

[Equation 6]

$$\theta = d_2 i \quad (6)$$

From the above, the equation (4) directly represents the phase space distribution in an orthogonal coordinate system in the output-side space.

Next, the curvature of the wave front of the space distribution shown in equation (4) is calculated. Generally, the wave front of the spherical surface wave has the position of r from the origin represented by the following equation (7) when assuming that the center is an origin.

[Equation 7]

$$z = \sqrt{r^2 - x^2} \quad (7)$$

When this equation (7) is subjected to a Maclaurin expansion until the squared term is reached, the following equation (8) is obtained.

[Equation 8]

$$z = r - \frac{1}{2r}x^2 \quad (8)$$

When this equation (8) is compared with the equation (4), then the following equation (9) is obtained.

[Equation 9]

$$\frac{1}{2r} = \frac{r_1 z_0 (z_0^2 - r_1 z_0 + x_0^2)}{\sqrt[3]{z_0^2 + x_0^2}} \quad (9)$$

Specifically, the output-side wave front has the curvature radius r2 represented by the following equation (10).

[Equation 10]

$$r_2 = \frac{\sqrt[3]{z_0^2 + x_0^2}}{2 r_1 z_0 (z_0^2 - r_1 z_0 + x_0^2)} \quad (10)$$

An optical signal is collected at the position Q away from the output end 305a of the array waveguide 305 by r2. In this case, the beam waist size w2 at the light collection position Q is represented by the following equation (11) using W shown in the equation (2) when r2 has a sufficient length.

[Equation 11]

$$W = w_2 \sqrt{1 + \left(\frac{\lambda r_2}{\pi w_2^2}\right)^2} \quad (11)$$

By the way, the input waveguide 302b is provided within a region of r0>0. Thus, the wave front of the optical signal outputted to the output end is convergent when the input waveguides 302a, 302b and 3012c as well as the slab waveguide 304 are connected at a point exterior to an arc that has a center on a line connecting the light axis with the intersection point of the boundary 304b (a connecting plane of the slab waveguide 304 and the array waveguide 305).

Conditions at which the respective principal rays of the space-side output wave front of optical signals from the respective input waveguides 302a to 302c are parallel to the light axis (i.e., telecentric conditions) can be calculated as shown below. Generally, a parabola $y = ax^2 + bx$ has an axis of $x = -b/2a$. Thus, the space-side wave front of the equation (4) has an axis $\theta_0$ (the vertex of the parabola) is represented by the following equation (12).

[Equation 12]

$$\theta_0 = -\frac{b}{2a} = -\frac{-\frac{r_1 x_0}{\sqrt{z_0^2 + x_0^2}}}{-\frac{r_1 z_0 (z_0^2 - r_1 z_0 + x_0^2)}{\sqrt[3]{z_0^2 + x_0^2}}} = -\frac{(z_0^2 + x_0^2) x_0}{z_0 (z_0^2 - r_1 z_0 + x_0^2)} \quad (12)$$

In FIG. 1, x0 exists in a negative direction and thus the angle $\theta_0$ has a positive value (that is, zo>r1). Thus, when a beam is existed from the point P in the direction of the equation (12), the principal ray of the beam in the space-side output is parallel to the light axis at the $\theta_0 > 0$ side.

In the above description, a case was described in which an optical signal was inputted from a one specific port (e.g., the input waveguide 302b). However, an optical signal can be inputted from other ports (e.g., input waveguides 302a and 302c) to realize a collimated array having a desired beam size at a position having away from the optical waveguide output end 305a by r2.

The slab waveguide 304 of the this embodiment is formed to have the arc face 304a having the radius r0 around the point C as a center and the arc face 304b having a radius r1 around the point C as a center and does not include the micro lens array and the optical fiber in Patent Literature 1. This eliminates the need for the micro lens array and the optical fiber in Patent Literature 1, thus promoting the mass production of the optical system of this embodiment.

<Second Embodiment>

The first embodiment was described with regard to a case in which the respective light paths of the array waveguide 305 all have a difference of zero. However, an input optical system having a high freedom degree can be realized by providing the respective light paths of the array waveguide 305 with a difference other than zero.

Specifically, when the respective light paths of the array waveguide 305 are set to have a difference changing from the center of the array waveguide 305 with a quadratic distribution, then, the squared term coefficient of θ shown in the equation (4) can be changed for example. This is to substitute θ of the equation (4) with aθ by an appropriate coefficient "a". Thus, the position Q of the space-side beam waist shown in the equation (10) can be adjusted.

The difference between the lengths of the light paths of the array waveguide 305 also can be subjected not only to the quadratic distribution but also to a higher-order distribution than a squared distribution. For example, when a component having a quartic phase distribution is given, the beam convergence can be further adjusted, thus allowing the point Q to move in the light axis direction more efficiently. Furthermore, giving a tertiary phase can also provide the correction of aberration for example.

<Third Embodiment>

In the first and second embodiments, they were described based on an assumption that the output end 305a of the space-side array waveguide 305 had an infinite curvature (i.e., the output end 305a had a flat face). However, another layout also may be used in which the output end 305a of the array waveguide 305 has a curved face. For example, when the input end 305a of the array waveguide 305 has a concave face when seen from the point Q, the input end 305a itself has a light collection function. Thus, the light collection position (beam waist position) can be moved to the light waveguide substrate 301.

<Fourth Embodiment>

The shapes of the input end 304a of the slab waveguide 304 and the output end 305a of the array waveguide 305 shown in FIG. 1 can be changed. For example, when the array waveguide 305 is formed so that the respective waveguides of the array waveguide 305 have a fixed light path and the output end 305a of the array waveguide is given with a higher-order component (e.g., tertiary or quartic component) to an array number, such an input optical system can be achieved that has the same function as that of the second embodiment.

The first arc 304a to the input waveguides 302a, 302b and 302c may have a different radius while maintaining the same center. Specifically, the arc 304a to the input waveguide 302a has a radius different from that of the arc 304a to the input waveguide 302b and that of the arc 304a to the input waveguide 302c. By such a setting, the wave front curvature radius r2 at the free space side also can be changed for each input.

<Fifth Embodiment>

The above respective embodiment has been described for a case in which the pitch between waveguides in the array waveguide 305 is equal for the input end 304b of the slab waveguide 305 and the output end 305a. However, W of the left member of the equation (11) can be converted by setting such a pitch that is different between the input end 304a and the output end 305a of the slab waveguide 305. For example, when assuming that the pitch between waveguides at the input end 305a is d1 and the pitch between waveguides at the output end 305a is d2, the equation (2) and the equation (11) can be used to obtain the following equation (13).

[Equation 13]

$$w_0\sqrt{1+\left(\frac{\lambda r_2}{\pi w_0^2}\right)^2}\frac{d_2}{d_1}=w_2\sqrt{1+\left(\frac{\lambda r_2}{\pi w_2^2}\right)^2} \quad (13)$$

In this case, an effect can be provided according to which the waist size w2 can be arbitrarily adjusted.

<Sixth Embodiment>

When the pitches d1 and d2 among waveguides at the respective end faces 304a and 305a of the array waveguide 305 are not set to a fixed interval, the beam shape at the light collection position (beam waist) Q also can be changed. For example, when the beam shape at the point Q is formed to have a Sinc function-like shape, the array waveguide 305 may have the wave front at the output end 305a set to have a rectangular shape. The reason is that the wave front shape at the output end 305a and the wave front shape at the point Q have a relation based on Fourier transformation.

Figure 8:
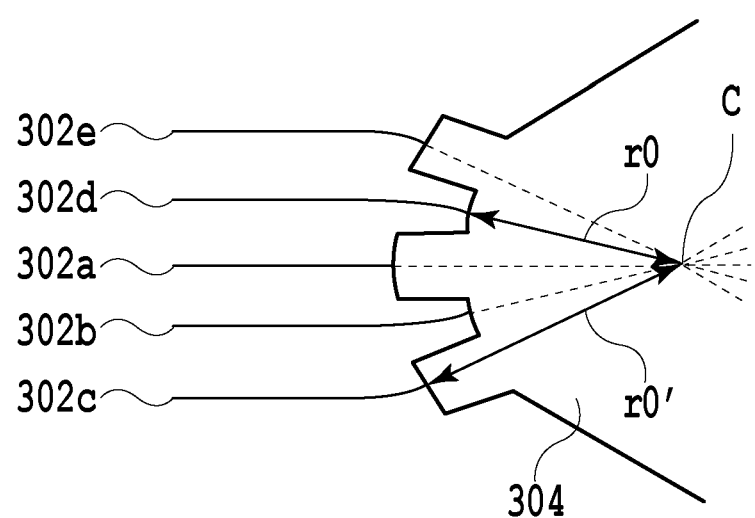
FIG. 8 illustrates an example configuration of the optical signal processing device according to an example modification of the tenth embodiment illustrating an expanded view of the connection part of an input waveguide and a slab waveguide.

In this case, in the 2f optical system shown in FIG. 8, the beam shape on the LCOS 203 also can have a rectangular shape. The beam on the LCOS 203 having a rectangular shape can provide, when compared with a case of a Gauss shape, the localization of optical energy in the center of the LCOS 203, thus providing an efficient use of LCO pixels.

The following section will describe a method of forming the above-described rectangular beam. Ideally, a rectangular beam is preferred. However, in this embodiment, an example is shown in which a higher-order Gaussian beam is used as a substitute for a rectangular shape. The output end 304b of the array waveguide 305 has an equal pitch d1 between waveguides. The position of the output end 305a of the array waveguide 305 is changeable. In this case, a higher-order Gauss beam is represented by the following equation (14).

[Equation 14]

$$f(x)=\exp\left[-\left(\frac{x^2}{w^2}\right)^\alpha\right] \quad (14)$$

In the equation (14), α shows an order of the Gauss beam.

When assuming that the coordinate axis along the input end 304a of the slab waveguide 304 is xa1 and the coordinate axis along the input end 304a of the slab waveguide 304 is xa2, then changing a pitch at the input end 304a in the array waveguide 305 to a pitch at the output end 305a in the array waveguide 305 is equivalent to changing the coordinate system of xa1 to the coordinate system of xa2.

At the input end-side coordinate system xa1, the optical signal reaches as a Gaussian beam. Thus, α=1 is established for α shown in the equation (14). Thus, the coordinate conversion from the coordinate system xa1 to xa2 is represented by the following equation (15).

[Equation 15]

$$\exp\left[-\left(\frac{x_{a1}^2}{w^2}\right)^1\right]=\exp\left[-\left(\frac{x_{a2}^2}{w^2}\right)^\alpha\right] \quad (15)$$

From this viewpoint, the coordinate conversion may be carried out as shown by the following equation (16).

[Equation 16]

$$x_{a2} = [w^{2(\alpha-1)} x_{a1}^2]^{\frac{1}{2\alpha}} \quad (16)$$

Figure 2:
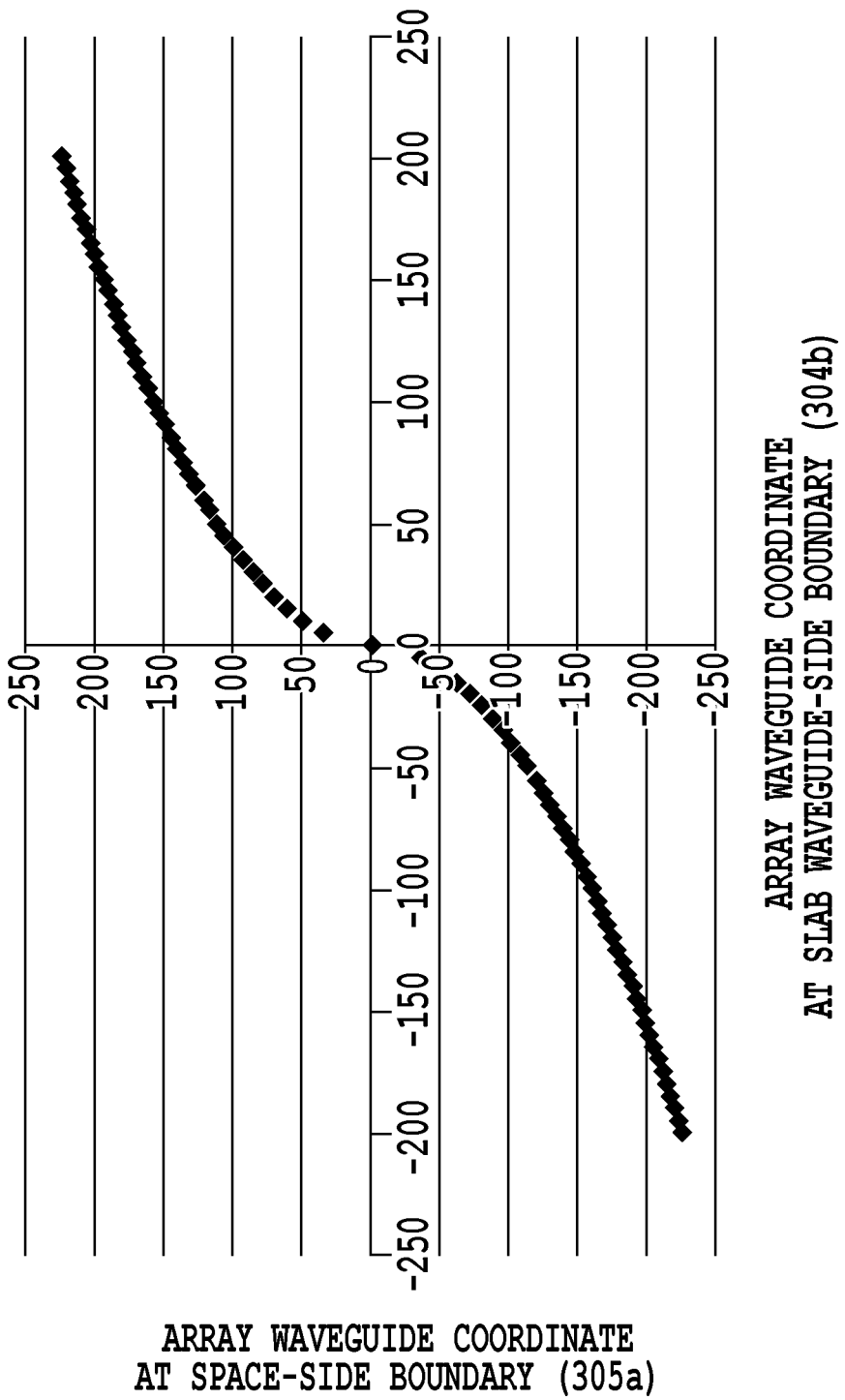
FIG. 2 illustrates one example of the positional relation between the input end and the output end of an array waveguide in the sixth embodiment.

Next, the following section will describe the relation between the coordinate of the input end 304a and the coordinate of the output end 305a in the array waveguide 305 with reference to FIG. 2. FIG. 2 illustrates an example of the positional relation between the input end 304b of the array waveguide 305 and the output end 305a.

As shown in FIG. 2, the coordinate (−250 to +250) of the input end 304b of the array waveguide 305 and the coordinate (−250 to +250) of the output end 305a of the array waveguide 305 are shown. The coordinates as described above are used to carry out the above-described coordinate conversion.

Figure 3:
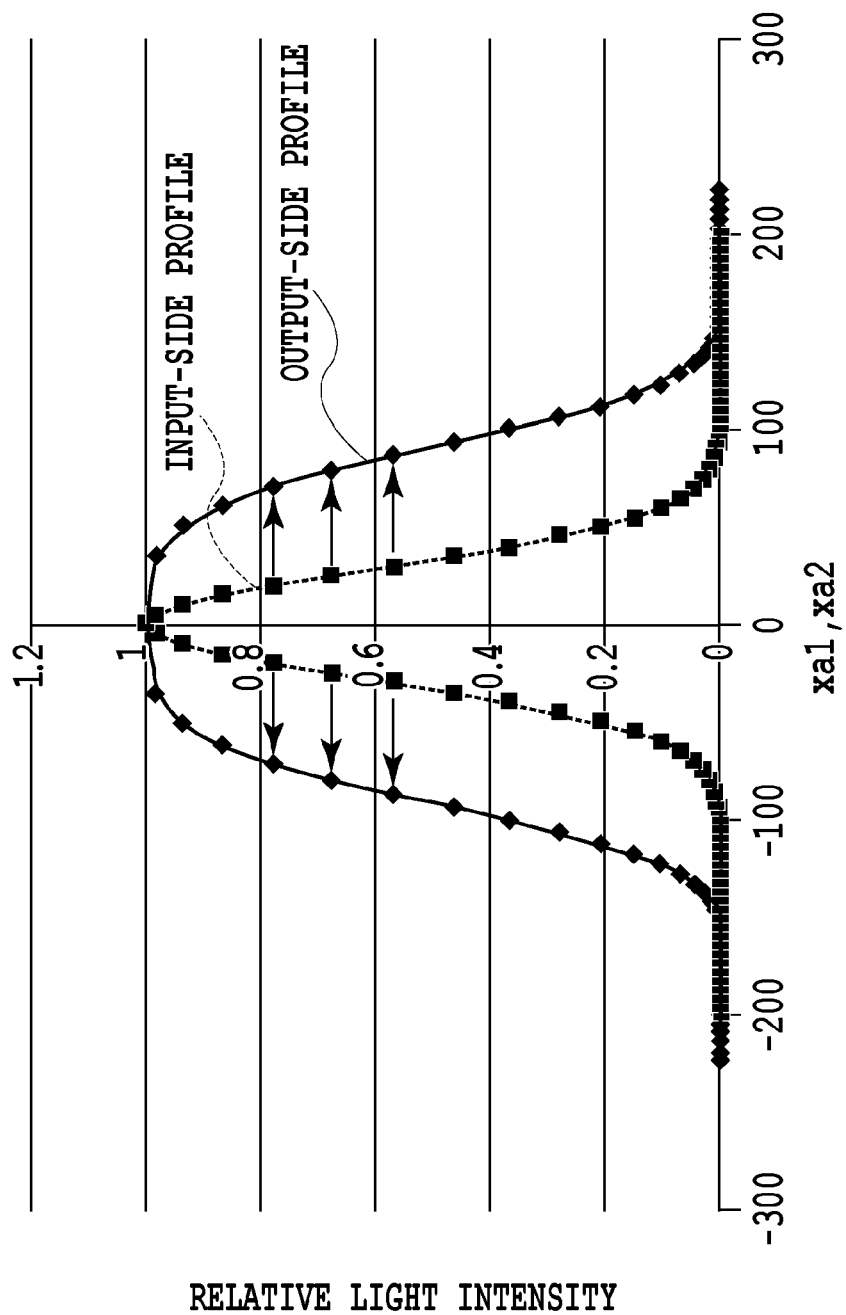
FIG. 3 illustrates an example relation between each arc face of a slab waveguide and a relative light intensity in the sixth embodiment.

FIG. 3 shows the strength distribution of the respective waveguides of the array waveguide 305 when the coordinate conversion as described above is performed. FIG. 3 illustrates an example of the strength distribution of the respective waveguides of the array waveguide 305. In FIG. 3, the horizontal axis shows the coordinate system of xa1 and xa2 while the vertical axis shows the relative light intensity.

In FIG. 3, the Gaussian beam has an order $\alpha$ for which $\alpha=8$. The input-side profile means the light intensity at the input end 304b of the array waveguide 305. The output-side profile means the light intensity at the output end 305a of the array waveguide 305.

In this embodiment, the above-described pitch d1 is a fixed interval and the above-described pitch d2 is changeable but can be changed so long as a coordinate conversion for providing a desired shape can be achieved. For example, the pitch d1 may be changeable and the pitch d2 may be a fixed interval or both of pitches d1 and d2 may be changeable.

In addition to the coordinate conversion between coordinate systems xa1 and xa2 in order to obtain a desired output waveform or wave front, the light path length of the array waveguide 305 may be further modulated to change the phase distribution. In this case, the phase distribution also should be changed in order to obtain a sine function-like profile. However, the length of the array waveguide 305 for example may be modulated depending on a change of the phase of the light wave front. Further, it is clear that the phase distribution may be modulated by forming the input end 304a and the output end 305a to have an arbitrary shape other than a simple circle or flat face.

Furthermore, the strength distribution also can be modulated by forming the input end 304a and the output end 305a of the array waveguide 305 to have a different opening width.

<Seventh Embodiment>

Figure 4:
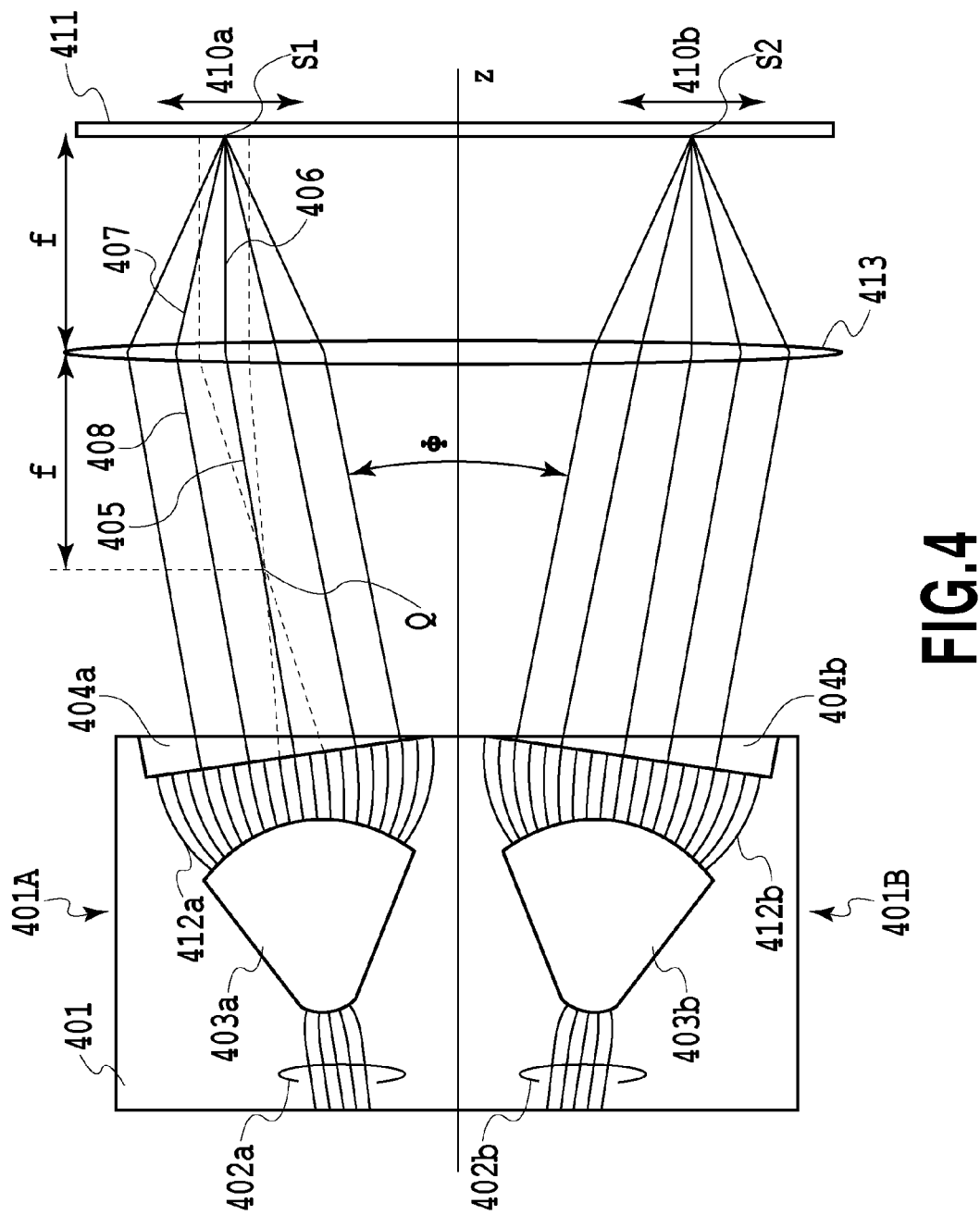
FIG. 4 illustrates an example configuration of an optical signal processing device according to the seventh embodiment.

The optical signal processing device according to the seventh embodiment is configured so that one substrate has thereon two input optical systems for example shown in FIG. 1. FIG. 4 illustrates an example configuration of the optical signal processing device according to the seventh embodiment.

In the optical system shown in FIG. 4, the optical signal processing device includes two input optical systems 401A and 401B formed on the substrate 401. Each of the input optical systems 401A and 401B is provided with an angle Φ shown in FIG. 4.

The input optical system 401A includes an input waveguide 402a, a slab waveguide 403a, an array waveguide 412a and a collimated array 404a. The input optical system 401B includes an input waveguide 402b, a slab waveguide 403b, an array waveguide 412b and a collimated array 404b.

Next, the following section will describe the operation of the optical signal processing device according to this embodiment with reference to FIG. 4 again.

In this optical signal processing device, an optical signal outputted from the input optical system 401A into a space is outputted so that the respective principal rays of the collimated array 404a with regard to the light axis z has an angle $\phi/2$. On the other hand, an optical signal outputted from the input optical system 401B into the space is outputted so that the respective principal rays of the collimated array 404a with regard to the light axis z has an angle $-\phi/2$.

The following section will describe the operation of the input optical systems 401A and 401B.

In FIG. 4, the position away from the point Q by the distance f has a lens 413 having the focal point distance f. A position further away by distance f has an LCOS 411. In this case, the principal ray reaches S1 positioned above the light axis z. The position of S1 is the same when an optical signal is inputted from any waveguide in the input waveguide 402a in the input optical system 401A.

The principal ray of the optical signal from the input optical system 401B also reaches S2 positioned below the light axis z. The position of S2 is the same when an optical signal is inputted from any waveguide in the input waveguide 402b in the input optical system 401B.

The configurations of the input optical systems 401A and 401B allows an optical signal to reach different positions S1 and S2, thus allowing one LCOS 411 to be shared by the two optical systems 401A and 401B.

On the other hand, due to the light input from the input optical system 401A, an optical signal having a beam waist at the point Q propagates to the lens 413 while expanding. After passing through the lens 413, the signal becomes parallel light. Then, the parallel light enters the region 410a of the LCOS 411. By the similar action, the optical signal from the input optical system 401B enters the region 410b of the LCOS 411 as shown in FIG. 4.

The optical system as described above is difficult to be configured by a fiber array and a micro lens and can be realized by the optical system of this embodiment. This embodiment has been described for a case in which two input optical systems 401A and 401B are used. However, three or more input optical systems also can be integrated on a substrate.

<Eighth Embodiment>

Figure 5:
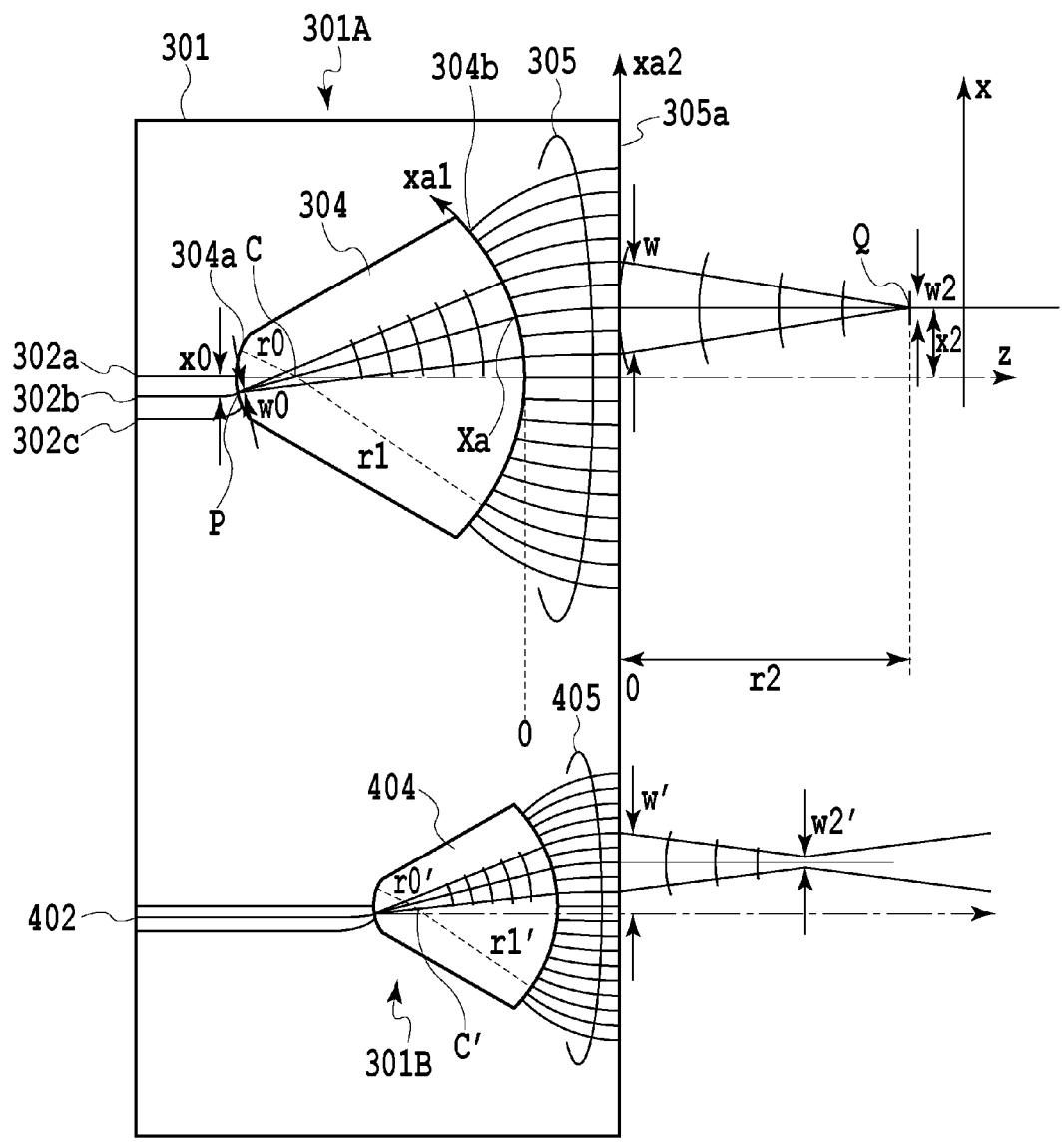
FIG. 5 illustrates an example configuration of the optical signal processing device according to the eighth embodiment.

An optical signal processing device according to the eighth embodiment is configured so that different input optical systems are provided on one substrate. FIG. 5 illustrates an example configuration of the optical signal processing device according to the eighth embodiment.

The optical signal processing device shown in FIG. 5 includes two input optical systems 301A and 301B formed on the substrate 301.

The input optical system 301A has a configuration similar to that of the input optical system shown in FIG. 1. Specifically, the input optical system 301A includes an optical waveguide formed on the waveguide substrate 301. The optical waveguide includes the input waveguides 302a, 302b and 302c, the slab waveguide 304 and the array waveguide 305.

On the other hand, the input optical system 301B has a different configuration from that of the input optical system shown in FIG. 1. The input optical system 301B includes an optical waveguide formed on the waveguide substrate 301.

The optical waveguide includes an input waveguide 402, a slab waveguide 404 and an array waveguide 405.

The slab waveguide 404 has an arc face having a radius r0' around a point C' as a center and an arc face having a radius r1' around the point C' as a center. In this case, r0'<r1' is established. However, r0'>r1' or r0'=r1' also may be established.

In FIG. 5, w2' illustrates a beam waist size in the light collection position.

<Ninth Embodiment>

Figure 6:
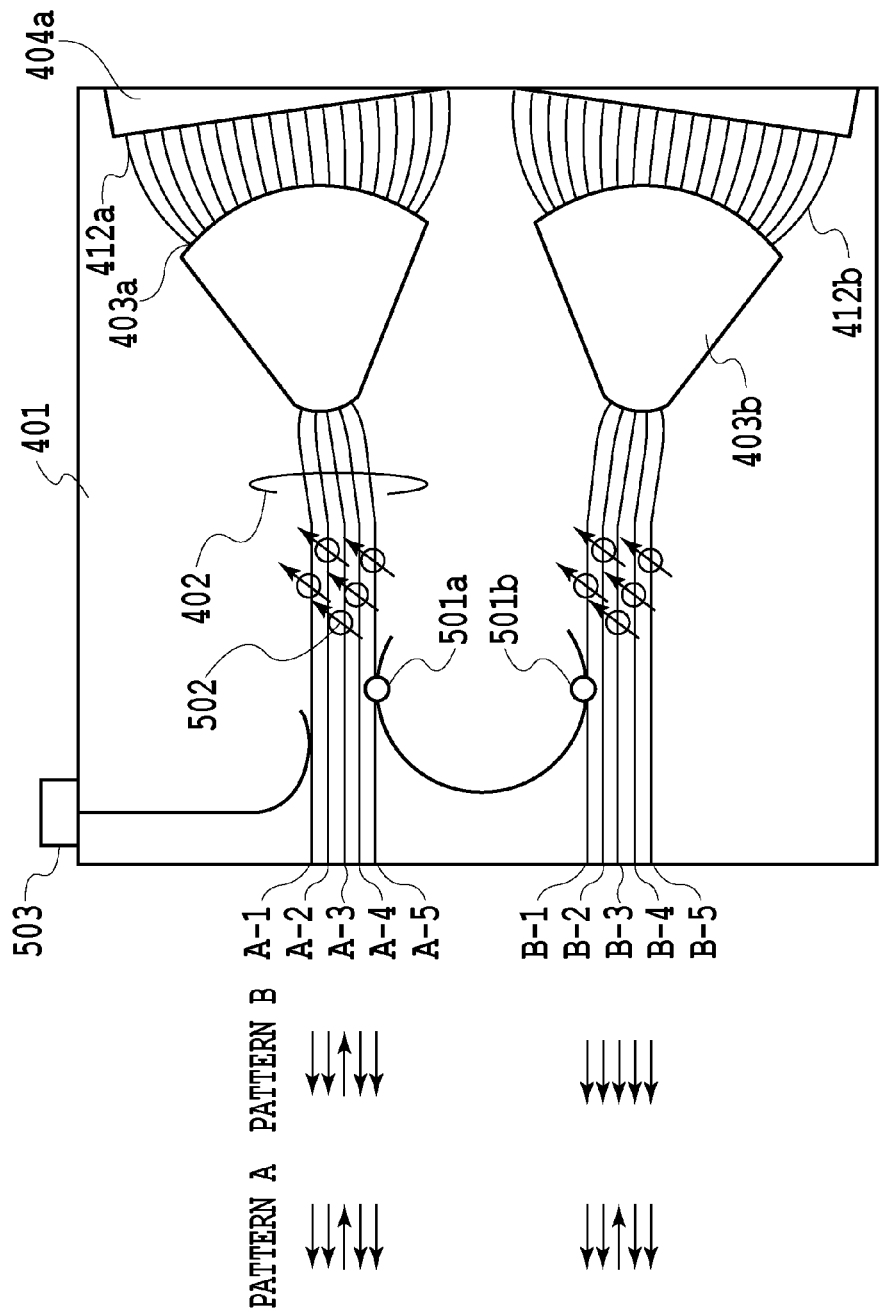
FIG. 6 illustrates an example configuration of the optical signal processing device according to the ninth embodiment.

The optical signal processing device of the ninth embodiment is configured so that the input waveguide shown in FIG. 6 includes a Mach-Zehnder interferometer. FIG. 6 illustrates an example configuration of the optical signal processing device according to the ninth embodiment.

In FIG. 6, input waveguides in the first input optical system are denoted with A-1, A-2, . . . , and A-5 while input waveguides in the second input optical system are denoted with B-1, B-2, . . . , and B-5. In FIG. 6, the number of the respective input waveguides is five but the number can be changed.

In FIG. 6, the input waveguides A-5 and B-1 include switches 501a and 501b using Mach-Zehnder interferometers, respectively and ports of the respective input waveguides are mutually connected. When both of these switches 501a and 501b using Mach-Zehnder interferometers are in a through status, an input optical system having a slab waveguide 403a and an input optical system having a slab waveguide 403b both function as an independent 1×4 switch. This is called as Pattern A. This status is shown by the arrow of Pattern A of FIG. 6.

When the switches 501a and 501b using Mach-Zehnder interferometers are in a cross status on the other hand, the switches 501a and 501b function as a 1×7 switch. This status is called as Pattern B. This status is also shown by the arrow of Pattern B of FIG. 6.

In the case of Pattern B, an optical signal inputted through the input waveguide A-3 is routed to any of the input waveguides A-1, A-2, A-4 and A-5. When the optical signal is routed to the input waveguide A-5, the signal is tandemly connected to the optical signal processing device of the input optical system having the slab waveguide 403b. The input optical system functions as an optical signal processing device that assumes the input waveguide B-1 as an input to route input to the input waveguides B-2, B-3, B-4 and B-5, consequently functioning as a 1×7 switch.

By providing the Mach-Zehnder interferometer in the input waveguide as described above, an optical signal processing device having a changeable switch scale is realized.

As shown in FIG. 6, the optical signal processing device also can be configured so that the input waveguides A-1 to A-5 and B-1 to B-5 respectively include a changeable attenuator 502 using a Mach-Zehnder interferometer. This is realized by connecting two input and output ports among the four input and output ports of the Mach-Zehnder interferometer to the input waveguides A-1 to A-5 and B-1 to B-5.

As shown in FIG. 6, the optical signal processing device also can further include an optical power monitor function. In FIG. 6, the input waveguide A-1 is added with a tapped circuit 503 using a Mach-Zehnder interferometer and the output thereof has a photodiode 504. In this configuration, when the input of an optical signal for example is used as the input waveguide A-3 and is routed to the input waveguide A-1, the strength of the optical signal inputted to the input waveguide A-3 can be monitored. Furthermore, when a space optical part includes a wavelength-selective function as in an optical system shown in the conventional example, the wavelength-selective function thereof can be used to provide the power monitoring for each wavelength. The function as described above is known as an optical channel monitor or an optical performance monitor and expands the function of the optical signal processing device.

<Tenth Embodiment>

Figure 7:
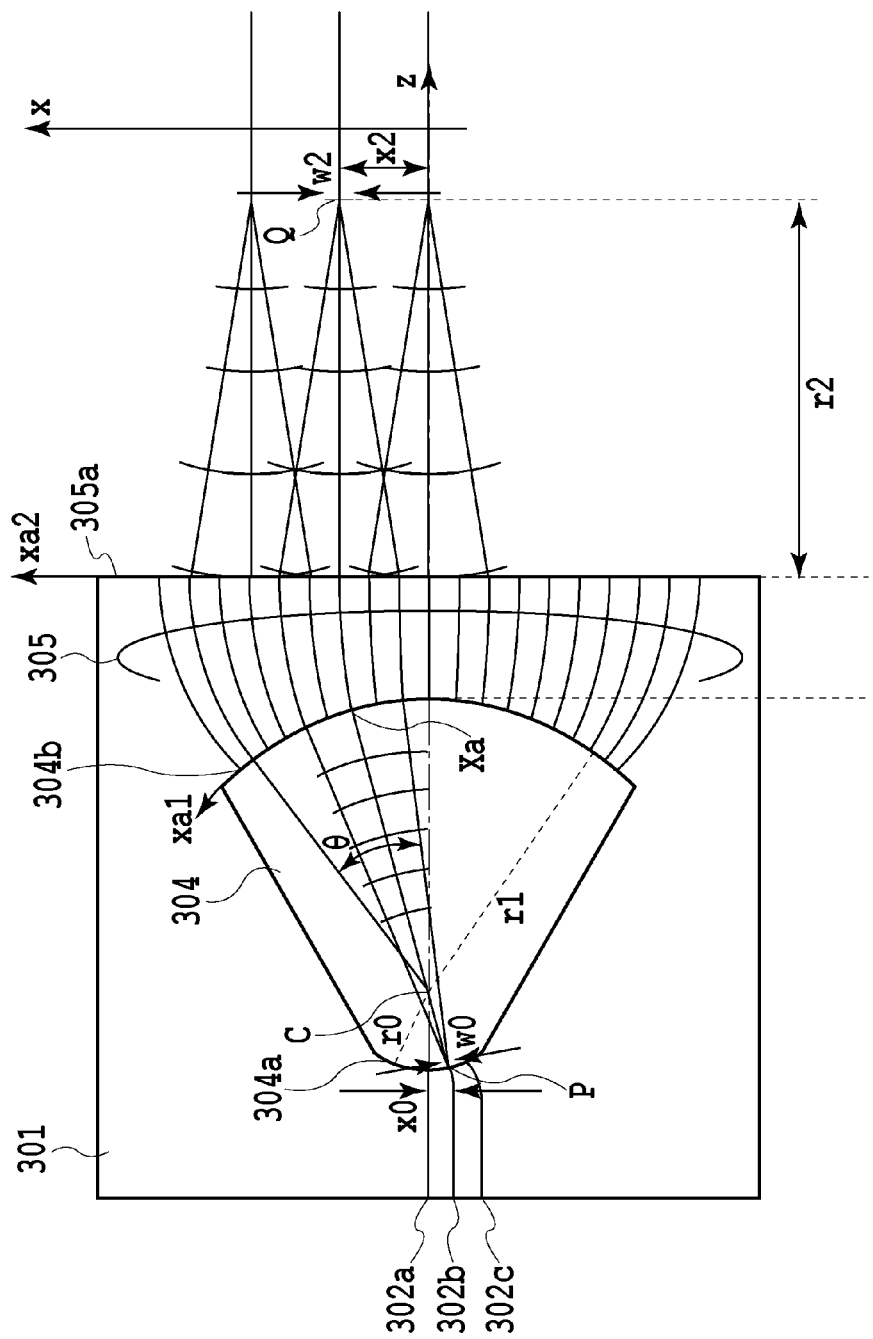
FIG. 7 illustrates an example configuration of the optical signal processing device according to the tenth embodiment.
Figure 15:
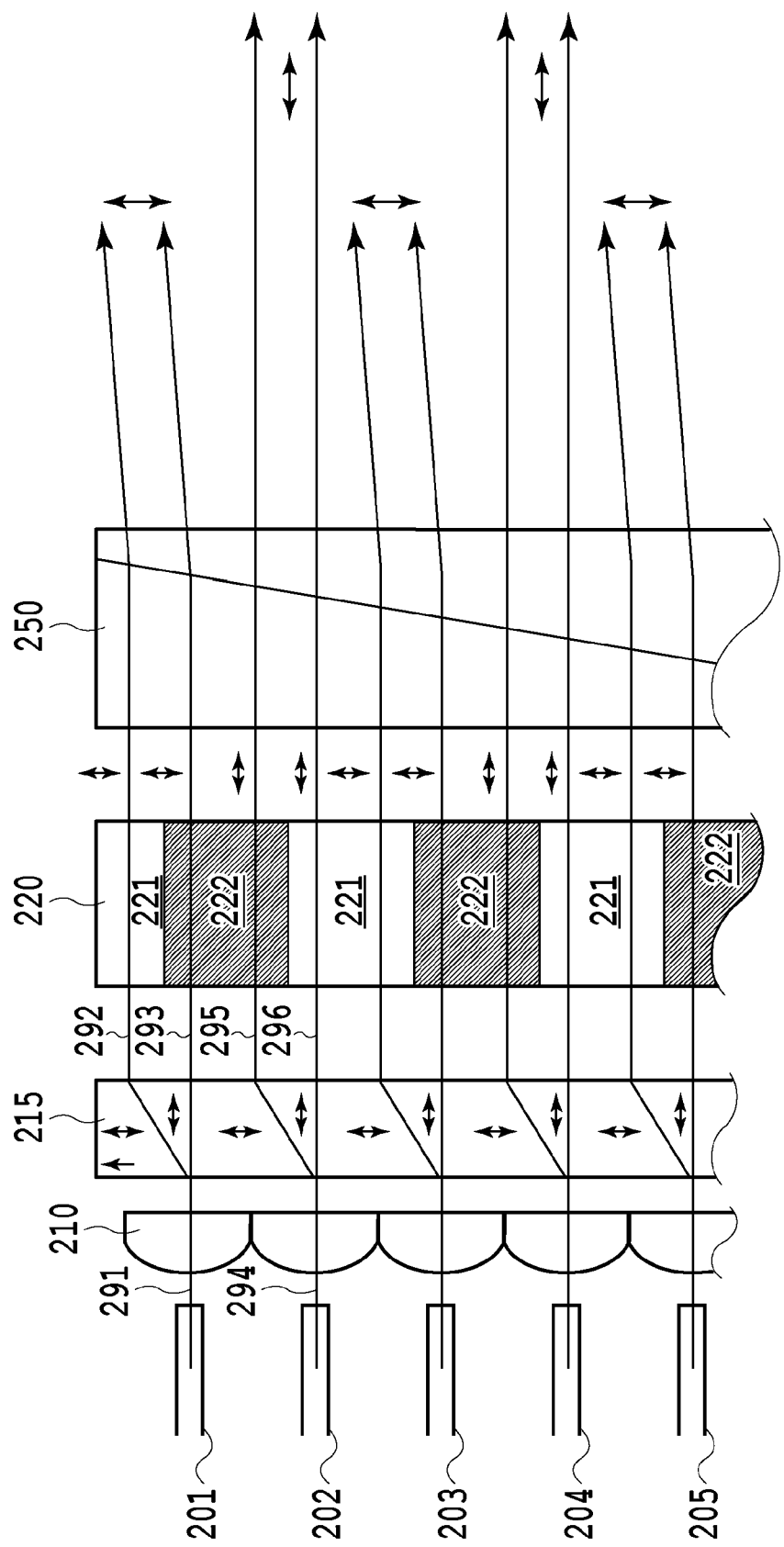
FIG. 15 illustrates a configuration illustrating another conventional wavelength-selective switch.

The optical signal processing device of the tenth embodiment realizes a configuration obtained by simplifying the optical system of the conventional example shown in FIG. 15. FIG. 7 illustrates an example configuration of an optical signal processing device according to the tenth embodiment. The configuration of the optical signal processing device is the same as those shown in FIG. 1 and FIG. 5. Thus, the following description of this embodiment will directly use, unless otherwise specified, the reference numerals used in the description for FIG. 1 and FIG. 5.

In the example of FIG. 7, it is different from FIG. 1 and FIG. 5 in that a plurality of beams is outputted from the optical waveguide 301. Specifically, in FIG. 1 and FIG. 5, an example shown that one beam waist was formed at the position Q. In FIG. 7, it is different from this in showing a case in which a plurality of beam waists is formed at the point Q, Q1 and Q2 and optical signals inputted through the input waveguides 302a to 302c are formed at the outer side of the optical waveguide 301. FIG. 7 is the same as FIG. 1 to FIG. 5 and the same function also can be realized by the configurations of FIG. 1 to FIG. 5 but the is clearly shown in FIG. 7.

In FIG. 7, the points Q, Q1 and Q2 are at a position having a distance r2 from the optical waveguide end face 305a.

In this case, optical signals from the input waveguides 302a and 302c are adjusted, as in the optical signal from the input waveguide 302b, so that the principal rays of the optical signal passes with regard to the point C in the slab waveguide 304. As a result, the output lights from the input waveguides 302a and 302c can be directed, during the output from the optical waveguide 301, in the same direction as that of the output light from the input waveguide 302b.

In this embodiment, in order to realize polarization diversity, a position on a straight line connecting the above-described positions Q, Q1 and Q2 and the array waveguide output end 305a (the solid line in FIG. 7) is provided with the optical element 220 as in Patent Literature 1. The configuration in this case is realized easily. The reason is that the optical system illustrated in this embodiment has a configuration that allows the micro lens array and the optical fibers to be positioned by a photolithography step during the manufacture of the optical waveguide 301. Thus, the micro lens array and the optical fibers can be positioned more accurately.

(Modification Example)

Next, the following section will describe an example modification of the eleventh embodiment.

In FIG. 7, a case was described in which a point at which the input waveguides 302a, 302b and 302c are connected to the slab waveguide 304 was set at a position having the radius r0 around the point C as a center. However, a plurality of input waveguides also may be formed so that the radii r0 corresponding to the input waveguides adjacent to each other have different values. In this case, a position at which a beam waist is formed (Q, Q1 and Q2 in FIG. 7) is different.

FIG. 8 is an expanded view of the connecting point of the input waveguides 302a to 302e and the slab waveguide 304 in such a modification example.

In the example of FIG. 8, in addition to the input waveguides 302a to 302c shown in FIG. 7, input waveguides 302d and 302e are added. As shown in FIG. 8, the respective input waveguides 302a, 302c and 302e are connected to the slab waveguide 304 on an arc having the radius r0 having the point C as a center.

On the other hand, the input waveguides 302b and 302d are connected to the slab waveguide 304 on the arc having the radius r0 having the point C as a center. In this case, optical signals from the input waveguides 302a to 302e form beam waists at the outer side of the optical waveguide 301 as in the case shown in FIG. 7.

Figure 9:
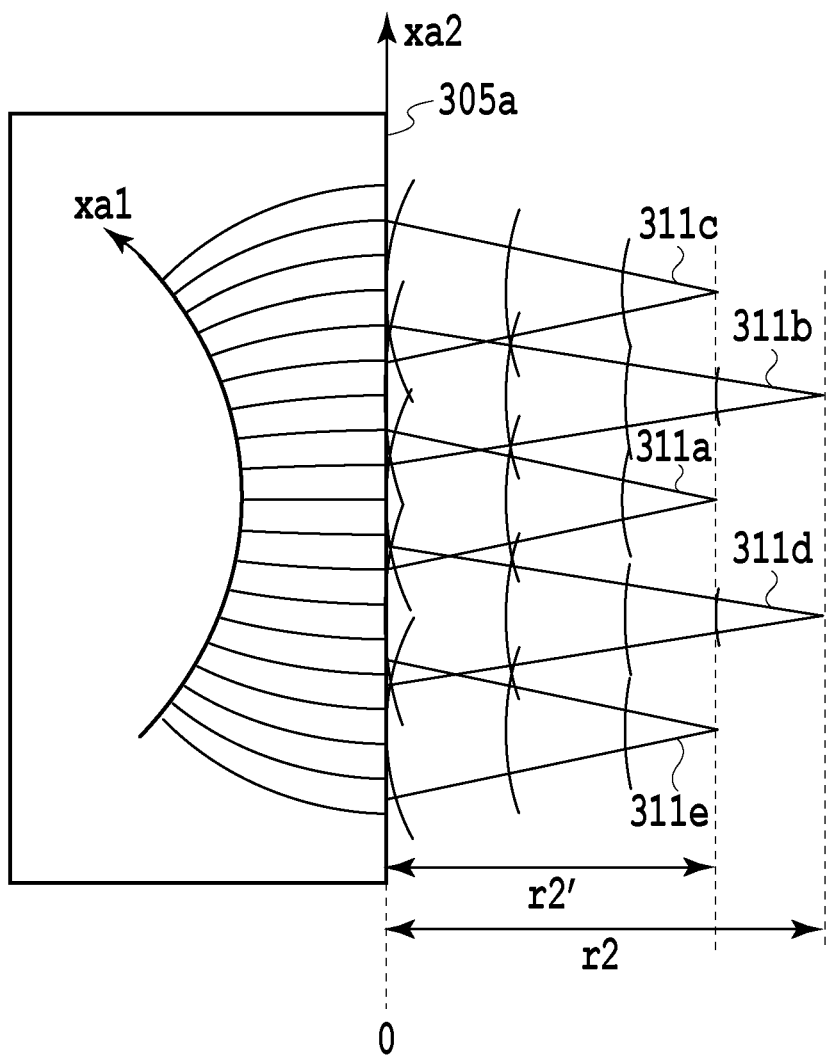
FIG. 9 illustrates an example configuration of the optical signal processing device according to an example modification of the tenth embodiment illustrating a beam waist position of an optical signal outputted from an output waveguide.

FIG. 9 illustrates a position at which the beam waist as described above is formed. Five output lights 311a to 311e shown in FIG. 9 correspond to optical signals from the input waveguides 302a, 302d, 302e, 302b and 302c, respectively.

In FIG. 9, the beam waists of the output lights 311b and 311d are formed at a position having the distance r2 from the array waveguide output end 305a. The beam waists of the output lights 311a, 311c and 311e are formed at a position having the distance r2' from the array waveguide output end 305a. Specifically, the beam waists of the optical signals 311a to 311e are formed at different positions.

As described above, according to the example modification of this embodiment, the point at which the input waveguides 301a to 301e are connected to the slab waveguide 304 as well as the distance from the point C (r0 and r0' in the example of FIG. 8) can be changed to thereby arbitrarily adjust the positions at which output lights 311a to 311e are collected.

Furthermore, when the optical element 220 as in Patent Literature 1 is provided in the optical signal processing device of the above-described example modification, it is preferred that the optical element configuration shown in Patent Literature 1 (glass/wavelength plate/glass/wavelength plate/ . . . ) is substituted with an optical element configuration consisting of air and a wavelength plate (air/wavelength plate/air/wavelength plate/ . . . ).

Figure 10:
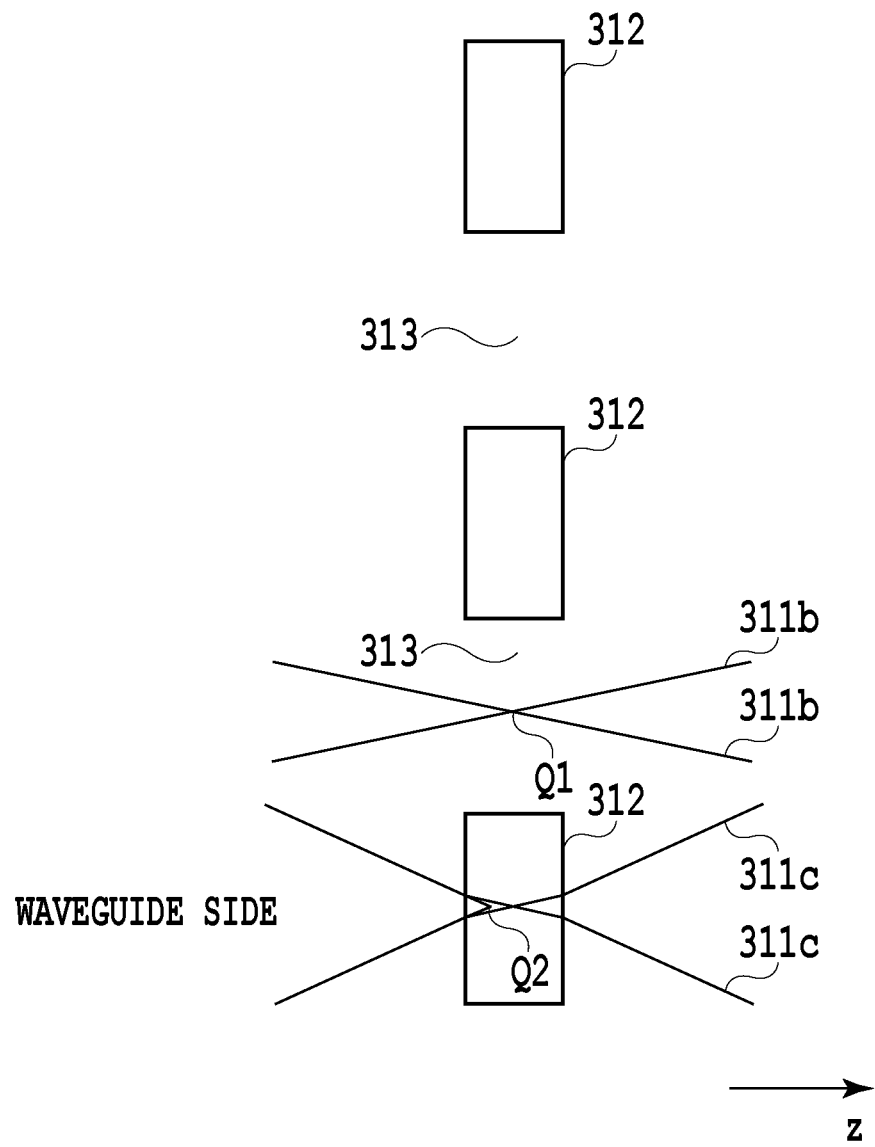
FIG. 10 illustrates a casein the optical signal processing device of the tenth embodiment and shows a light collection position when an air and wavelength plate is used to adjust the light collection position of the output beam.

FIG. 10 illustrates an example configuration of the interior of the optical element as described above. The optical element of FIG. 10 includes therein a wavelength plate region 312 and an air region 313.

FIG. 10 shows an optical signal 311c passing through the wavelength plate region 312 and an optical signal 311b passing through the air region 313.

For example, when the position Q1 of the beam waist of the optical signal 311c passing through the wavelength plate region 312 is set to be the same as the position of the beam waist of the optical signal 311b passing through the air region 313, the Snell's law determines the position of the beam waist of the optical signal 311c at a position at the right side of FIG. 10 (i.e., at a position in the z direction away from the optical waveguide than Q1).

When the position Q1 of the beam waist of the optical signal 311c passing through the wavelength plate region 312 is set in advance at Q2 (FIG. 10) on the other hand, the above-described Snell's law determines the position of the beam waist of the optical signal 311c is dislocated in the z direction and at the same center position as Q1. Specifically, when an optical element consists of air and a wavelength plate, the positions of the beam waists of the optical signals 311b and 311c can be adjusted to so that the optical signals 311b and 311c can effectively pass through a narrow opening in the optical element.

<Eleventh Embodiment>

In the above respective embodiments and modification examples, a case was described in which a plurality of optical signals (beams) was parallelly outputted from the optical waveguide. However, the respective optical signals also can be outputted at different directions. The following section will show principal rays only as light beams for simple description.

Figure 11:
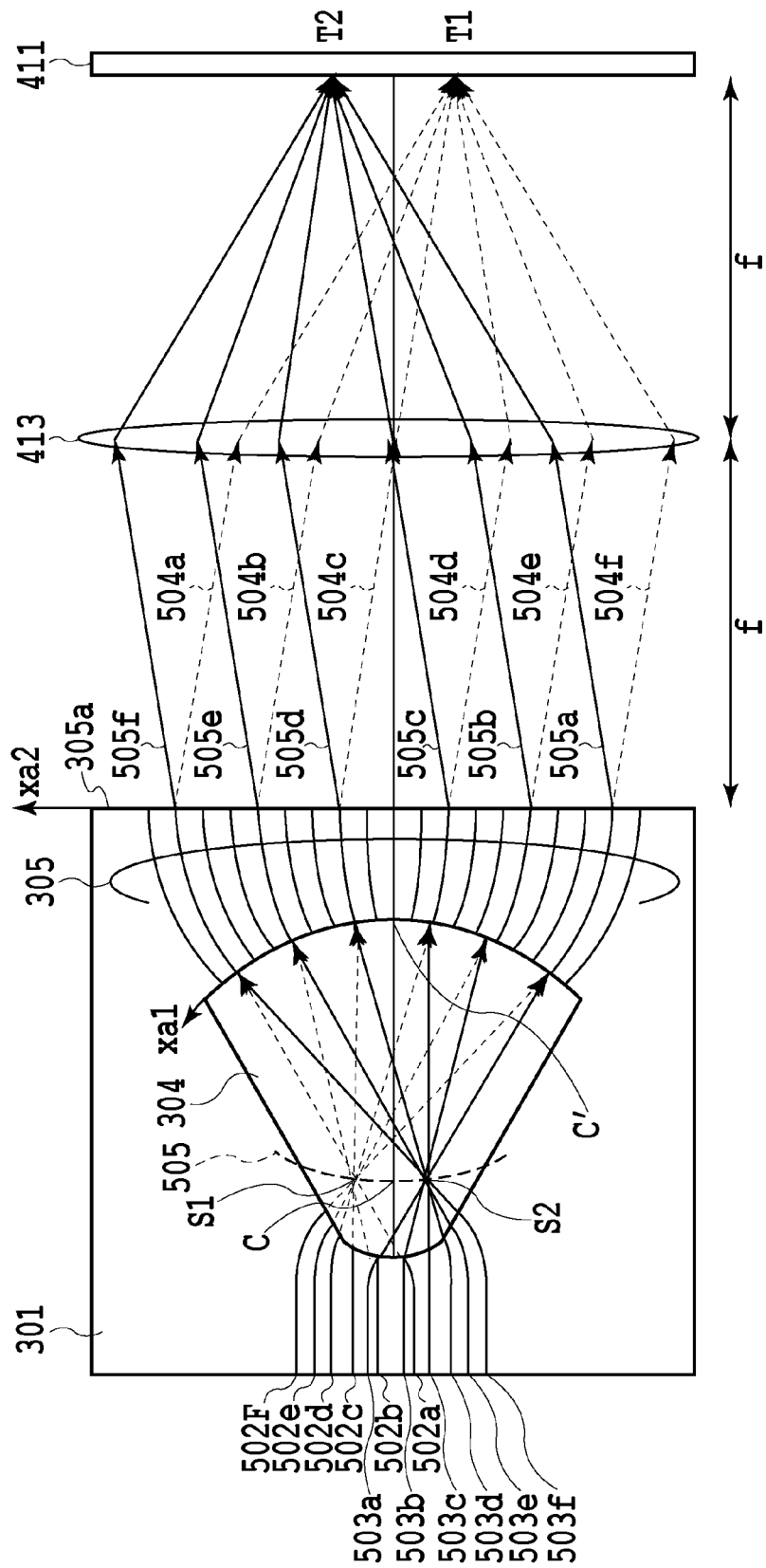
FIG. 11 illustrates an example configuration of the optical signal processing device according to the eleventh embodiment.
Figure 12:
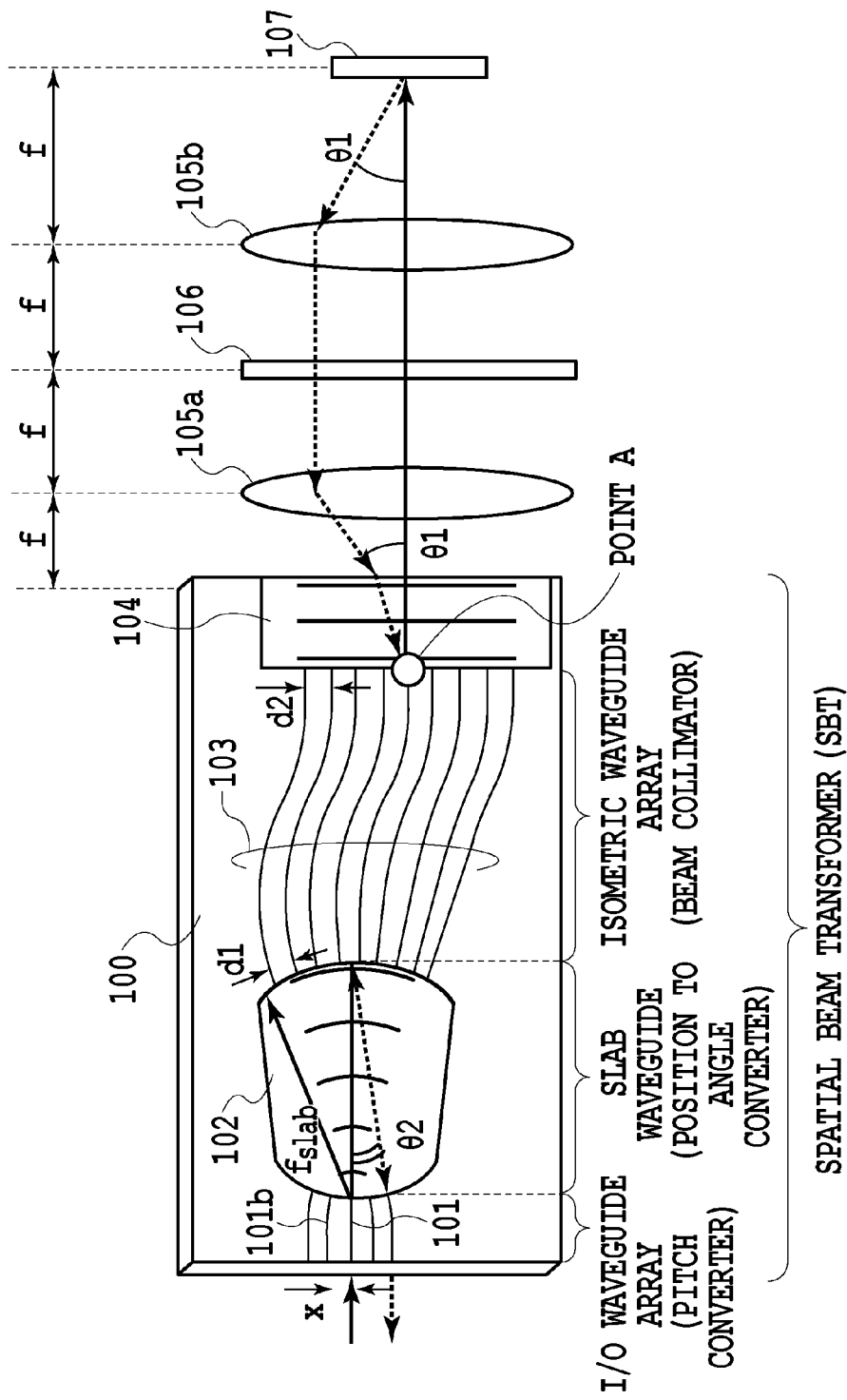
FIG. 12 illustrates a configuration of a conventional wavelength-selective switch.
Figure 13:
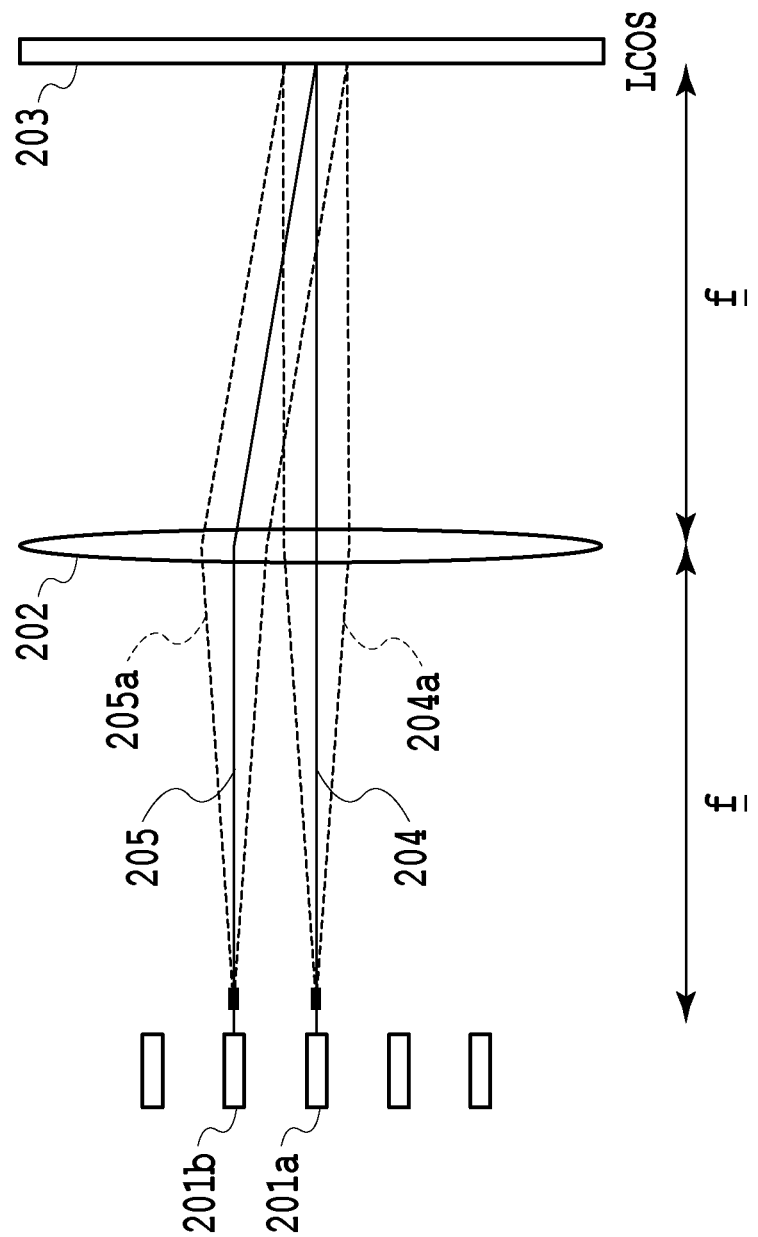
FIG. 13 illustrates a configuration of a general 2f optical system.
Figure 14:
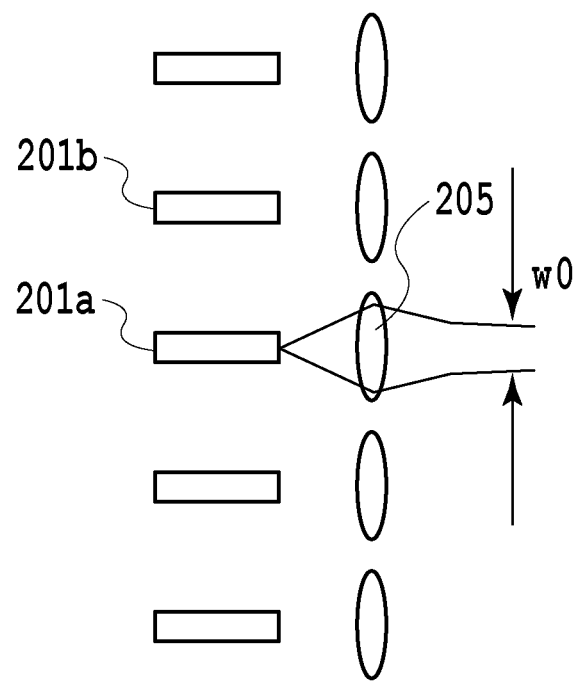
FIG. 14 illustrates a configuration embodiment in which a micro lens array is formed at the output end side of optical fibers.

FIG. 11 illustrates an example configuration of the optical signal processing device according to the eleventh embodiment. FIG. 11 illustrates the switch optical system of a wavelength-selective switch.

The switch optical system shown in FIG. 11 is configured, as in the above-described embodiment, the optical waveguide 301 has thereon input waveguides 502a to 502f, 503a to 503f, the slab waveguide 304 and the array waveguide 305.

In FIG. 11, C' shows an intersection point (connecting point) of a waveguide positioned at the center of the array waveguide 305 and the slab waveguide 304, the reference numeral 505 shows an arbitrary radius having the intersection point C' as a center, and S1 and S2 show two points different from the point C on the arc 505. The following section will assume that the arc 505 has a radius r1 for simplicity. An optical signal inputted via the input waveguides 502a to 502f is set so that the principal ray thereof passes through S1. An optical signal inputted via the input waveguides 503a to 503f is set so that the principal ray thereof passes through S2. S1 and S2 are an arbitrary point on the arc 505.

Furthermore, this switch optical system is set so that the principal rays of the respective optical signals from the input waveguides 502a and 503f are inputted to the same waveguide among the array waveguide 305. The principal rays of the respective optical signals from the input waveguides 502b and 503e are set to be inputted to the same waveguide among the array waveguide 305.

The principal rays of the respective optical signals from the input waveguides 502c and 503d are set to be inputted to the same waveguide among the array waveguide 305. The principal rays of the respective optical signals from the input waveguides 502d and 503c are set to be inputted to the same waveguide among the array waveguide 305.

The principal rays of the respective optical signals from the input waveguides 502e and 503b are set to be inputted to the same waveguide among the array waveguide 305. The principal rays of the respective optical signals from the input waveguides 502f and 503a are set to be inputted to the same waveguide among the array waveguide 305.

By forming optical signal processing device as described above, when an optical signal is outputted through the optical waveguide 301, optical signals from the input waveguides 502a to 502f are light beams 504a to 504f and optical signals from the input waveguide 503a to 503f are light beams 505a to 505f, respectively. After the output through the waveguide, the light beams 504a to 504f are parallel to each other and the light beams 505a to 505f are parallel to each other.

Furthermore, in FIG. 11, (1) the light beams 504a and 505f are outputted from the single point of the optical waveguide, (2) the light beams 504b and 505e are outputted from the single point of the, (3) the light beams 504c and 505d are outputted from the single point of the optical waveguide, (4) the light beams 504d and 505c are outputted from the single point of the optical waveguide, (5) the light beams 504e and 505b are outputted from the single point of the optical waveguide, (6) the light beams 504f and 505a are outputted from the single point of the optical waveguide.

The respective light beams 504a to 504f and 505a to 505f are subjected to a light path conversion by the lens 413 and are inputted to the COS 411. The lens 413 is assumed to have a focal point distance f. The distance from the optical waveguide end face 305a to the lens 413 and the distance from the lens 413 to the LCOS 411 are both assumed as f.

The light beams 504a to 504f subjected to the light path conversion by the lens 413 reach the point T1 on the LCOS 411. The light beams 505a to 505f reach the point T2 on the LCOS 411. In FIG. 11, a light beam group reaching the point T1 is shown by the dotted line and a light beam group reaching the point T2 is shown by the solid line, respectively.

According to this embodiment, two optical systems can be shared by one LCOS as shown in the seventh embodiment.

This embodiment has been described for a case in which two optical systems are integrated as an example. However, another configuration is also possible in which input waveguides are arranged differently so that the number of points on the arc 505 shown in FIG. 11 can be increased to S1, S2, S3, . . . , thereby integrating two or more optical systems.

The optical signal processing devices of the above respective embodiments and modification examples can be used in an arbitral combination.

The invention claimed is:

1. An optical signal processing device including a waveguide formed on a substrate, comprising:
    an input waveguide,
    an array waveguide, and
    a slab waveguide having at least one first arc provided around a single point as a center connected to the input waveguide, and a second arc provided around the single point at a center connected to the array waveguide,
    wherein an output end of the input waveguide is formed in the direction of the single point such that an optical signal outputted to the slab waveguide reaches a face of the second arc of the slab waveguide, and
    a beam diameter at the face of the second arc of the slab waveguide is based on a first radius of the first arc and a second radius of the second arc.

2. The optical signal processing device according to claim 1, wherein an output end of the input waveguide is formed toward the single point.

3. The optical signal processing device according to claim 1, wherein an output end of the input waveguide is formed toward a point different from the single point.

4. The optical signal processing device according to claim 1, wherein an input end of each waveguide in the array waveguide is formed toward the single point.

5. The optical signal processing device according to claim 1, wherein a path length of the array waveguide has a length distribution represented by a polynomial expression with regard to the number allocated to a waveguide in the array waveguide.

6. The optical signal processing device according to claim 1, wherein the position of the waveguide at an input end of the array waveguide and the position of the waveguide at an output end of the array waveguide allow for one-to-one coordinate transformation.

7. The optical signal processing device according to claim 1, wherein the array waveguide is connected, with regard to an arc forming the output end face of the slab waveguide, to a position obtained by modulating the shortest distance from the single point to the arc.

8. The optical signal processing device according to claim 1, wherein the output end of the array waveguide is disposed in a curved manner represented by a polynomial expression in a light axis direction.

9. An optical signal processing device comprising a plurality of the optical signal processing device according to claim 1 on a substrate.

10. The optical signal processing device according to claim 1, further comprising a Mach-Zehnder interferometer connected to the input waveguide.

11. The optical signal processing device according to claim 1, wherein the input waveguide further comprises a tapped circuit and a power monitor.

12. An optical signal processing device including a waveguide formed on a substrate, comprising:
    an input waveguide,
    an array waveguide, and
    a slab waveguide positioned between the input waveguide and the array waveguide, the slab waveguide including a first arc connected with the input waveguide and a second waveguide connected with the array waveguide,
    wherein the first arc is configured such that all inputs from the input array point to a center point and the second arc is configured such that all outputs point to the same center point, and
    wherein the center point is positioned inside the slab waveguide and the center point is a center point of the first arc and of the second arc.

13. The optical signal processing device of claim 12, wherein the a distance from the center point to the first arc is a first radius of the first arc and wherein a distance from the center point to the second arc is a second radius of the second arc.

* * * * *